Sept. 13, 1966   W. B. JAMISON   3,272,263
METHOD OF FIGHTING MINE FIRES
Original Filed March 7, 1960   3 Sheets-Sheet 1
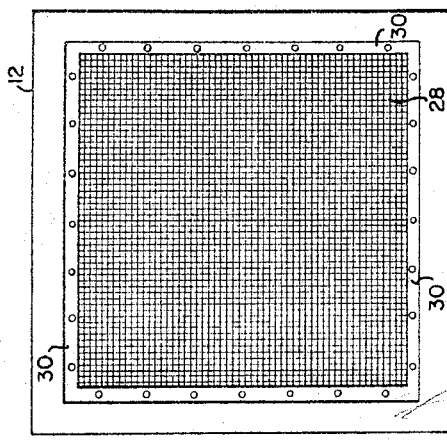
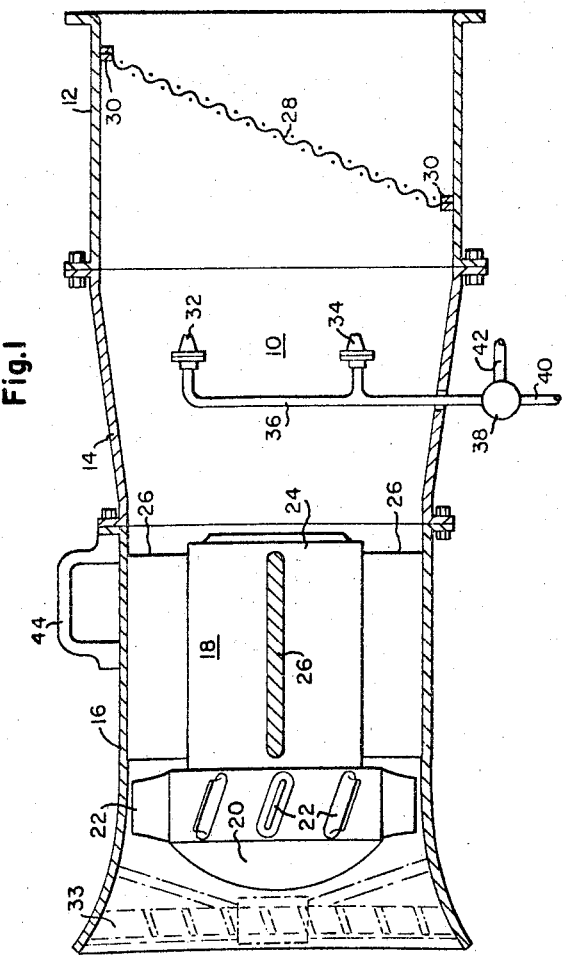
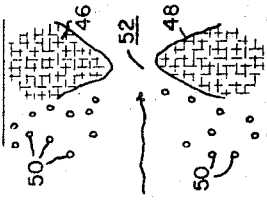
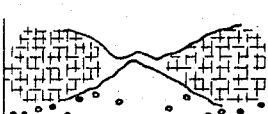
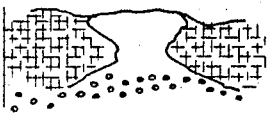
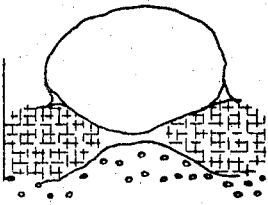
INVENTOR
Will B. Jamison
BY
ATTORNEY Sept. 13, 1966   W. B. JAMISON   3,272,263
METHOD OF FIGHTING MINE FIRES
Original Filed March 7, 1960   3 Sheets-Sheet 2
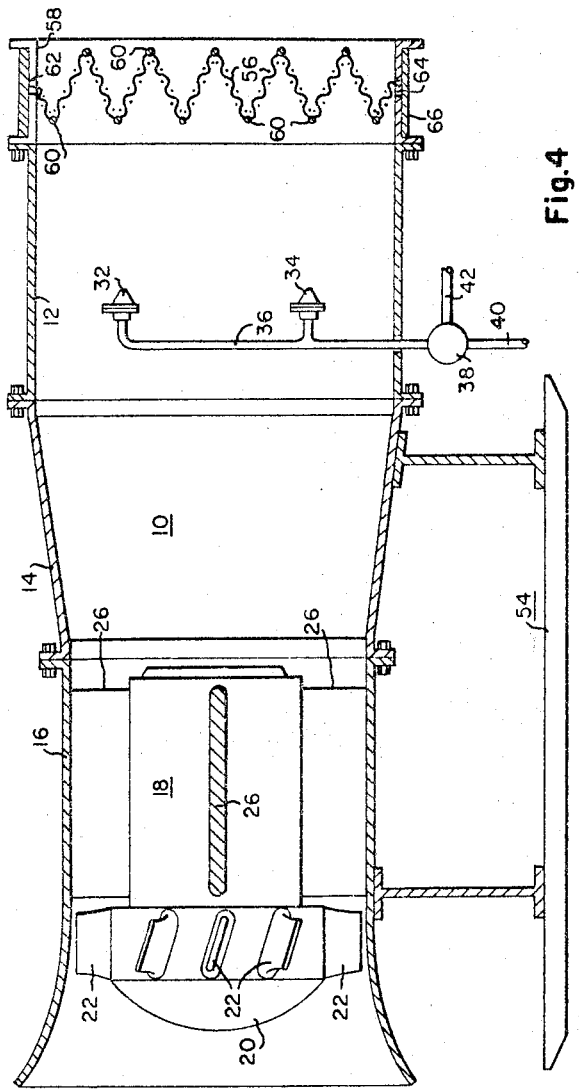
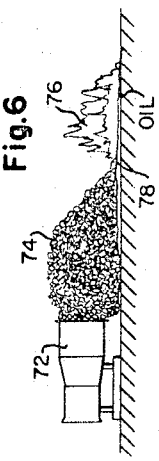
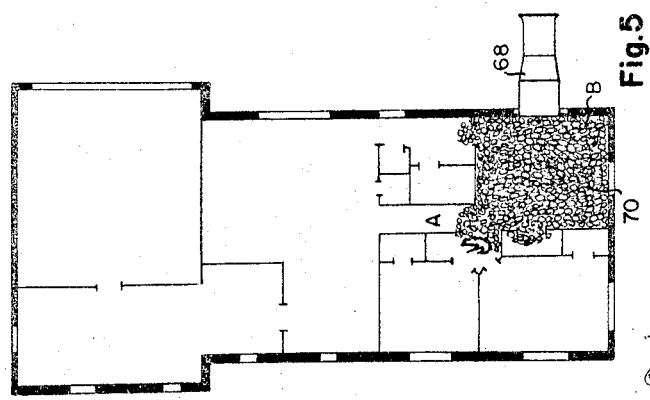
INVENTOR
Will B. Jamison
BY
ATTORNEY

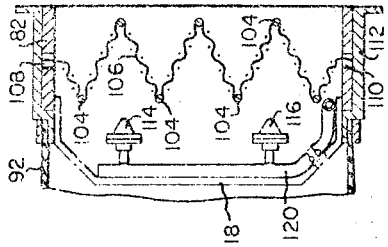
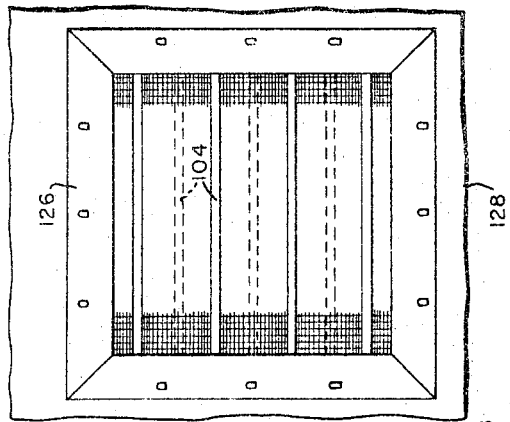
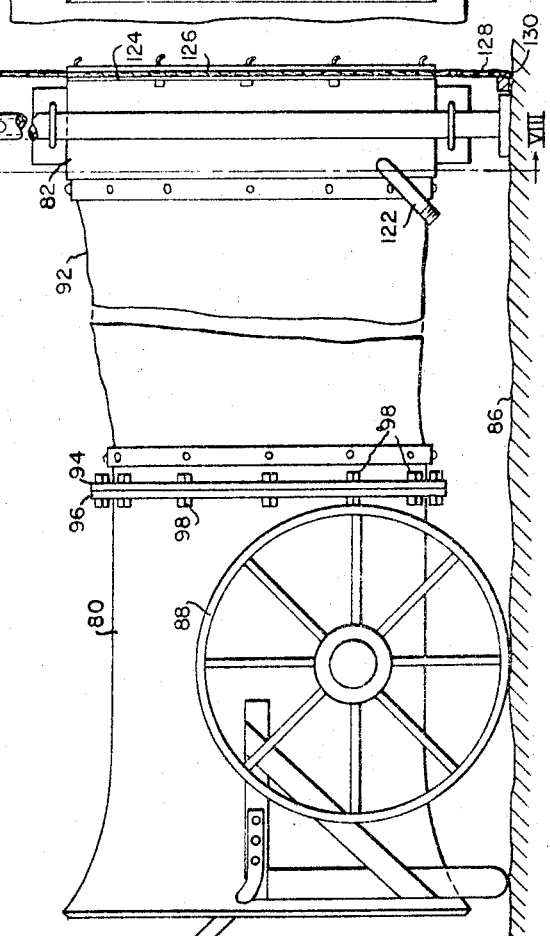
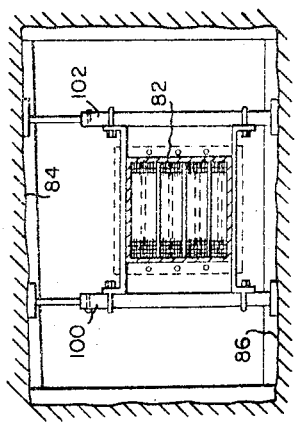
INVENTOR
Will B. Jamison
ATTORNEY 3,272,263
METHOD OF FIGHTING MINE FIRES
Will B. Jamison, Wyckoff, N.J., assignor, by mesne assignments, to Specialties Development Corporation, Belleville, N.J., a corporation of New Jersey
Original application Mar. 7, 1960, Ser. No. 13,103. Divided and this application Sept. 7, 1965, Ser. No. 485,382
2 Claims. (Cl. 169—15)

This invention relates to fire-fighting apparatus adaptable for use in fighting mine and building fires, as well as oil fires. More particularly, the invention relates to a method of fighting mine fires with apparatus of the type which generates a mass of water-containing foam or bubbles capable of extinguishing a fire.

This application is a division of copending application Serial No. 13,103, filed March 7, 1960, which was a continuation-in-part of application Serial No. 837,023, filed August 31, 1959, now abandoned.

The invention described herein as an outgrowth of a recently developed method of fighting fires in underground mines; however, it is by no means limited thereto and may be used to possibly better advantage in fighting building fires and other blazes where the fire zone is not readily accessible. As is well known, underground mine fires, once well established, are extremely difficult to extinguish. In such fires the actively flaming fire front is protected from attack from its forward end by the advance of heat and fumes, and from the other end by smoke, hot strata, and obstructed roadways. A water jet from a conventional fire hose is usually unsatisfactory for fighting underground fires due to the lowness of the mine roof which limits the range of the jet. In many cases such mine fires can be extinguished only by sealing a portion or all of the mine for months in an effort to shut off the supply of oxygen to the fire. This method, however, is unsatisfactory for many reasons. In addition to the loss of production during the time that the mine is sealed, there is always the danger of explosion within the sealed portion of the mine, as well as the possibility of the outbreak of fresh fires once the seal is broken.

Recently, a method was devised for fighting mine fires which consists of fitting a fabric net across the mine roadway as near as possible to the outbye end of the fire while continuously spraying the side of the net opposite the fire with a solution containing a wetting agent. The net is loosely knit from cotton yarn or some other highly absorbent material, the arrangement being such that a plurality of apertures are formed in the material across which bubbles may form. When the solution containing a wetting agent is thus sprayed onto the net, it will be absorbed by the cotton yarn until such time as the yarn becomes saturated. At this point the solution bridges across the various apertures in the net; and the ventilation air currents in the mine cause the formation of bubbles at these apertures. The mass of bubbles or foam plug formed by the net then fills the entire cross section of the mine roadway and travels down the roadway to the fire zone where the foam forms steam which eventually smothers the fire. By employing this method, the problem of access to the fire zone is eliminated since the foam-generating equipment may be spaced at a considerable distance from the blaze. Furthermore, the foam plug can effectively travel around corners so that the foam-generating equipment need not be positioned along a straight-line path with respect to the fire zone as would be the case, for example, with a water jet from a fire hose.

A foam plug of the type described above could, of course, also be used to fight building fires as well as other types of fires. Many of the same problems which hinder the fighting of mine fires are also present in such other fires. In the past, the most commonly used method for fighting fires in buildings and other places where the fire zone was not easily accessible usually consisted of attempting to spray a jet of water onto the blaze by means of a hose or some type of automatic sprinkler system. This method, however, is not altogether satisfactory. In the case of a fire hose, heat, smoke and other obstacles make it extremely difficult to get close enough to the fire zone where the water jet can be effectively directed onto the blaze. In many cases the most that can be done with a fire hose is to spray the area surrounding the blaze in the hope that the fire will not spread to other parts of the building. Even if a building is equipped with an automatic sprinkler system, the resultant damage caused by the water is oftentimes greater than the damage done by the fire itself. By employing a foam plug of the type described above, however, the problem of water damage is entirely eliminated since, although the foam fills the entire area of the building surrounding the fire, its water content is relatively small and does not soak furniture and other fixtures within the building. Furthermore, the problem of directing a water jet onto the fire zone is likewise eliminated.

As an overall object, the present invention seeks to provide new and improved apparatus for generating water-containing, fire-fighting foam material which can be used to extinguish either mine fires, building fires or other similar blazes. In one embodiment of the invention described herein, a fabricated wind tunnel is provided having a generally flat foam-forming net stretched across one end and a fan or the like at the other end which forces air axially through the tunnel. Between the fan and the net are one or more nozzles which spray a solution containing a wetting or foaming agent onto the net. With this arrangement, a much greater quantity of foam can be generated per unit of time for a given net size than could be generated in previously known mine arrangements where the ventilation air currents flowing through the mine roadway were employed to form bubbles. Furthermore, the apparatus can be made portable and used to fight fires other than those occurring in mines. As will be understood, a mine roadway forms, in effect, a wind tunnel through which air currents of relatively high velocity are induced by means of ventilation fans. Such ventilation air currents are necessary to carry away methane and other undesirable gases which would otherwise collect in the mine. Since the ventilation currents are normally present in a mine, it is a relatively simple matter to stretch a foam-forming net across the mine roadway whereby a miner may manually spray the solution containing a foaming agent onto the side of the net opposite the fire while the ventilation air currents in the roadway form bubbles on the side of the net facing the fire. This condition, of course, is special in the case of mine fires and does not occur, for example, in the case of building fires or outdoor fires. Accordingly, the present invention provides a fire-fighting arrangement which is self-contained and which may be made portable to accommodate any type of fire.

Another object of the invention is to provide means for generating a water-containing foam plug which may be used to extinguish oil fires. As is well known, carbon dioxide or the like is usually employed in fighting oil fires due to the fact that water from a fire hose merely spreads the oil and, hence, the fire. That is, the oil, being lighter than water, merely floats on top of the water and continues to burn while the water spreads the area of the fire. A foam plug of the type generated by the present invention, however, contains a large quantity of air so that it will effectively travel over the top of the oil to smother the fire. It has been found in actual practice that when a foam plug is directed onto burning oil or gasoline, for example, the foam bubbles adjacent the fire will form steam, and this steam will travel ahead of the foam plug to extinguish the blaze without spreading the oil. Thus, the foam generator of the invention may be used in place of the more costly carbon dioxide extinguisher with equal effectiveness.

Another object of the invention is to provide apparatus for generating fire-fighting foam in which the area required for the foam-forming net is minimized. The quantity of foam generated by spraying a solution containing a foaming agent onto a net is a function of the total area of the net within velocity limits, it being understood that the maximum rate of foam generation is increased as the number of bubble-forming apertures in the net is increased. In the case of mine fires, a net having a cross-sectional area of at least fifty square feet can be readily extended across the mine roadway, and the natural air currents within the mine will carry the foam plug forward to the fire area. In the case of building fires and the like, however, a similar situation does not exist so that the techniques applicable to mine fires cannot be used. Accordingly, in another embodiment of the invention the foam-forming net at one end of the wind tunnel is corrugated in a zigzag pattern across the mouth of the wind tunnel. The corrugations of the zigzag pattern may extend either horizontally or vertically; however, experimental results show that the horizontal arrangement is superior to vertical. In either case, the number of foam-forming apertures in the net is greatly increased over that which could be achieved by merely stretching the net over the mouth of the wind tunnel along a flat plane as in the embodiment of the invention previously described, and the foam-generating capacity of the unit is greatly increased for its size. In addition, it will be seen that by corrugating the foam-forming net, the solution containing the foaming agent which is sprayed onto the net for the purpose of forming bubbles may be more efficiently used with a minimum amount of run-off of the solution from the net.

As another object, the invention seeks to provide a portable fire-fighting foam generator of the type described above which is particularly adapted for use in fighting mine fires and the like. As was mentioned above, the method previously used to generate foam in mines employed ventilation currents for the purpose of forming bubbles at the apertures in a woven net stretched across the mine roadway. As will be understood, a mine may have many parallel roadways leading to a fire area, and in order to effectively form a foam plug by the use of ventilation currents, it was found necessary to block off all but one or possibly two of the parallel roadways. That is, in order to obtain effective foam generation, all of the ventilation currents had to be channeled into one, or possibly two, roadways where the foam-forming equipment was situated. Even with this arrangement, however, the range or length of the resultant foam plug was limited by the velocity and/or pressure of the ventilation currents. Furthermore, as the foam plug formed, it would create a back pressure which eventually reduced the velocity of the ventilation currents to the point where it was insufficient to generate additional foam. Under such circumstances, ventilation air currents in the mine would be effectively stopped, as would the foam-generating process. If, at this point, the foam plug had not yet reached the fire zone, the only recourse was to move the foam-forming net closer to the fire. At the same time, methane or other combustible gases could collect in the fire zone due to stoppage of ventilation currents and possibly cause an explosion.

In the present invention, in contrast to previously used methods, the range of the foam plug is not dependent upon ventilation air currents but may be regulated by varying the speed of a fan located directly behind the foam-forming net or by adjusting the position of a variable vane damper. In addition, all of many parallel roadways leading to the fire zone may remain open so that, if desired, ventilation currents may always be shunted around the foam plug and past the fire zone where they can sweep away combustible gases and minimize the possibility of explosion. In certain cases it may be desirable to slow down or shut off the ventilating fans and prevent spreading of the fire. This is possible with the present invention but, of course, could not be achieved with prior art procedures where foam generation was dependent upon the ventilation air currents.

A further object of the invention is to provide a new and improved method for generating water-containing, fire-fighting foam material.

Still another object of the invention is to provide a new and improved method for fighting fires in mines.

The above and other objects and features of the invention will become readily apparent from the following detailed description taken in connection with the accompanying drawings which form a part of this specification and in which:

FIG. 1 is a cross-sectional view of one embodiment of the invention employing a flat foam-forming net;

FIG. 2 is an end view of the embodiment of the invention shown in FIG. 1 illustrating the configuration of the flat foam-forming net;

FIGS. 3A–3E are enlarged views of an aperture of the foam-forming net illustrating the formation of a foam bubble;

FIG. 4 illustrates another embodiment of the invention wherein the foam-forming net is disposed across the mouth of a wind tunnel in a zigzag pattern;

FIG. 5 is a schematic illustration of the operation of the invention as applied to a conventional building fire;

FIG. 6 is a schematic illustration of the operation of the invention as applied to an oil fire;

FIG. 7 is a plan view of a portable embodiment of the invention which is particularly adapted for use in fighting mine fires;

FIG. 8 is cross-sectional view taken along line VIII—VIII of FIG. 7;

FIG. 9 is a sectional view illustrating the position of the foam-forming net and the solution-spraying nozzles of the embodiment of the invention shown in FIG. 7; and FIG. 10 is an end view of the embodiment of FIG. 7 showing the configuration of the foam-forming net used therein.

Referring to FIGS. 1 and 2, the embodiment of the invention shown comprises a wind tunnel 10 which is fabricated from three sections 12, 14 and 16. Sections 12 and 16 may be rectangular or circular in cross section, depending upon requirements, and have their cross-sectional areas fixed along their lengths. Section 14, however, is tapered and connects section 12 of larger cross-sectional area to section 16 of smaller cross-sectional area. As shown, bolts or other similar fastening means may be used to secure the respective sections together.

Positioned within section 16 of small cross-sectional area is a fan 18 having a rotor 20 with a plurality of fan blades 22 affixed thereto. Fan 18 is also provided with a stationary housing 24 having a plurality of vane 26 extending radially outwardly toward the wall of section 16. As will be understood, the fan 18 creates an air current which travels through the wind tunnel 10 from left to right as shown in FIG. 1.

Stretched across the mouth of the wind tunnel 10, within section 12, is a woven fabric foam-forming net, generally indicated at 28. As shown, the net 28 is inclined and is secured to the walls of the wind tunnel 10 by means of flanges or bands 30 extending around the inner periphery of section 12. Intermediate the fan 18 and the net 28 are a pair of nozzles 32 and 34 connected through conduit 36 to a valve 38 which serves to mix water from conduit 40 with a wetting or foaming agent from conduit 42. Any suitable wetting agent in conduit 42 may be used which will generate bubbles on the net 28. However, as an example, 30 percent active ammonium lauryl sulfate dissolved in water in a proportion of about 15 percent active material by weight to give a concentrate in conduit 42 which is then mixed with water in conduit 40 at the rate of about 3 percent by volume has been found to give sufficiently good results in generating the foam material. In the particular embodiment of the invention shown in FIG. 1, a handle 44 is provided whereby the entire generator may be transported from place to place. As an alternative, however, the generator may be permanently installed at a fixed location or may be provided with wheels, skids, or other similar devices for rendering it transportable.

In operation, the solution containing a wetting agent is sprayed by nozzles 32 and 34 onto the net 28 while fan 18 forces air through the wind tunnel 10. When the net 28, through which air from fan 18 is passing, is sprayed on one side with the foaming agent solution from nozzles 32 and 34, foam is formed on the right side of the net as shown in FIGS. 1 and 2. This foam is produced by the air blowing bubbles from films of liquid which are stretched over the holes or apertures in the net. The stage-by-stage formation of a bubble is shown in FIGS. 3A–3E where two successive strands 46 and 48 of the net are shown. Liquid from nozzles 32 and 34 is sprayed at a constant rate and hits the net in the form of droplets 50 having diameters considerably smaller than those of the apertures 52 in the net. It is probable that most of the droplets hit, and are absorbed by, the fabric surrounding the holes. This action will continue until the fabric (i.e., strands 46 and 48) of the net becomes saturated, at which time the liquid will drain from the strands both by gravity and capillary action to the periphery of the hole and onto any hairs or irregularities that protrude into its center. As soon as sufficient liquid has accumulated to bridge across the strands 46 and 48, a film will rapidly form over the hole as shown in FIGS. 3B and 3C, and a bubble will be blown as illustrated in FIGS. 3D and 3E. After one bubble laves the aperture 52, another film will form over the aperture and a second bubble will be blown, and so on. The strands 46 and 48 may be cotton or any other highly absorbent material which will retain a liquid, the "high absorbency" being great enough to produce the bubble-forming action shown in FIGS. 3A–3B. Certain types of absorbent nylon, for example, may be used in place of cotton.

By virtue of the fact that the fan 18 is included in the wind tunnel 10, the amount of foam generated across the net 28 can be controlled by varying the speed of the fan or, alternately, by adjusting a movable vane damper, schematically illustrated at 33, which is positioned within the wind tunnel. This is in contrast to arrangements previously employed in mines wherein the amount of foam generated by the net was a function of the velocity of the ventilation air currents flowing through the mine roadway. The number of bubbles formed by the net 28 can be increased by increasing the velocity of the air stream through the net as was explained above; however, there is an upper limiting velocity of the air above which bubbles will not form. In other words, bubbles will not form across the apertures or holes of the net when the air velocity is too great. It has been found that with the flat net configuration of FIG. 1, the air velocity flowing through the wind tunnel 10 may vary between about 80 and 600 feet per minute with an optimum value of about 300 feet per minute. At the upper velocity limit of 600 feet per minute, very poor quality foam is formed because of the high velocity of the air flowing through the net. Some of the solution sprayed onto the net 28 will not form bubbles and will drain off. With the configuration of the net shown in FIG. 1, it has been found that the loss of solution due to drainage of this type is about 10 to 20 percent of the total volume of liquid absorbed by the various strands of the fabric. As can be seen in the drawings, the fan, in contrast to the mine ventilation arrangement of the prior art, is quite close to the nozzles and the net. In this respect, it can be seen that the distance between the fan and the net is clearly not more than 20 times the distance between the nozzles and the net.

In FIG. 4, another embodiment of the invention is shown which has greatly improved operational characteristics over the embodiment shown in FIGS. 1 and 2. Since many of the elements in FIG. 4 correspond to those shown in FIG. 1, they are identified by like reference numerals and are not hereinafter described in detail. In this case, however, the wind tunnel 10 is supported on a skid arrangement, generally indicated at 54, to render it transportable. The greatly improved operational characteristics of the embodiment of FIG. 4 are due to the fact that the foam-forming net 56 in this case is corrugated in a zigzag pattern across the mouth of the wind tunnel 10. As shown, one end of section 12 has connected thereto a short section 58 which carries the corrugated foam-forming net 56. A plurality of horizontally extending support rods 60 are staggered along the height of the outlet of the wind tunnel and are carried in the sides of section 58 whereby the net 56 may be stretched around the various support rods in a zigzag pattern as it extends across the discharge end of the wind tunnel. As shown in FIG. 4, the fabric extends through slots 62 and 64 in section 58 where it may be folded over the outside surface of the section and held in place by band 66.

It should be apparent that with the arrangement shown in FIG. 4, the number of foam-forming apertures in the net is greatly increased for any given cross-sectional area of the wind tunnel; and, consequently, the apparatus shown in FIG. 4 has a much greater foam-generating capacity than the apparatus of FIG. 1 wherein the foam-forming net is flat. In addition to increasing the number of foam-foaming apertures, the zigzag pattern of FIG. 4 has many additional advantages. Reverting to FIGS. 3A–3E, it will be seen that a certain number of the droplets 50 will pass directly through the apertures 52 rather than being absorbed by the strands 46 and 48. These droplets are, of course, lost and cannot be used to generate foam. Since, however, the apertures in the net 56 of the embodiment shown in FIG. 4 are disposed at an acute angle with respect to the direction of movement of air through wind tunnel 10, a very small portion of the area of each aperture will be available through which a droplet may pass. Consequently, the sprayed solution is almost entirely, if not entirely, absorbed by the net 56 and very little, if any, is lost by passing through the apertures 52. Furthermore, the velocity of the air stream passing through wind tunnel 10 in the embodiment of FIG. 4 can be increased over that of the device of FIG. 1 due to the fact that the fabric in net 56 is disposed at an acute angle to the air stream whereby the air stream will intersect the films of liquid which form across the apertures 52 at a steep angle. In this manner, only a component of the full force of the air stream is imposed directly on the liquid films so that the air velocity within the wind tunnel may be considerably increased and the foam-generating capacity of the unit increased in addition to the increase effected by the larger number of apertures in the net for a given cross-sectional area of the wind tunnel. Whereas the maximum air velocity passing through the wind tunnel for the embodiment of FIG. 1 is 600 feet per minute, most efficient foam-generating operation is achieved with the embodiment of FIG. 4 when the air velocity is in the range of about 700 to 800 feet per minute. Still another advantage of the corrugated net resides in the fact that a much smaller amount of the solution sprayed onto the net is lost than in the case where a flat net is used. Whereas 10 to 20 percent of the solution in the net fibers is lost in a flat net by virtue of drainage, less than 2 percent is lost in the case of a corrugated net such as that shown in FIG. 4. Thus, almost all of the solution sprayed onto the net in the embodiment of FIG. 4 is converted into foam, and the wasteful loss of the solution by drainage from the net is reduced to a minimum.

Although a zigzag pattern of the net is shown herein for illustrative purposes, it should be understood that any form of corrugation may be used as long as the number of apertures in the net is increased. As was mentioned above, however, the net in which the zigzag corrugations extend horizontally is more effective than one in which they are vertical. Actually, any configuration of the net which is not a continuous flat plane will improve its foam-forming capabilities due to the fact that a larger number of apertures are formed in the net, and these apertures are disposed at an angle to the air flowing through the wind tunnel, notwithstanding the fact that the axis of each aperture is nevertheless substantially perpendicular to its adjacent surface of the net as shown in FIGS. 3A–3E.

The application of the invention to a conventional building fire is shown in FIG. 5. Thus, a fire may break out in hall A within the building, but the area may be inaccessible due to smoke and fumes. The apparatus of the present invention, however, generally indicated at 68 in FIG. 5, may be readily inserted through a window in room B. Fan 18 and the nozzles 32 and 34 will then be turned on whereby a mass of foam 70 will completely fill room B and overflow into the inaccessible hall A where the foam will form steam which smothers the fire. After the fire is extinguished, the foam bubbles will break down, and the small amount of moisture left in room B will ordinarily evaporate by natural means without damage to furniture and other fixtures. Naturally, a foam plug which can fill the entire volume of an enclosure must have a high expansion ratio on the order of 30 to 1 or greater, meaning that 30 volumes of foam will be produced for one volume of liquid sprayed onto the net. Actually, the expansion ratio can be as high as 2000 to 1; however the higher the expansion ratio the less stable the foam, meaning that the bubbles forming the foam will break faster as the expansion ratio is increased.

The application of the invention to an oil fire is shown in FIG. 6 where the foam generator, constructed in accordance with the embodiment of either FIG. 1 or FIG. 4 and identified by the numeral 72, produces a foam plug 74 which travels over the top of the oil to the actively flaming fire front of the blaze 76. As shown, the heat of the blaze 76 transforms the water-containing bubbles at the forward edge of the foam plug 74 into steam which blankets the surface of the oil as at 78 to smother the fire. Thus, even though the foam plug 74 contains a substantial amount of water, this water is in the form of bubbles which will "float" on top of the oil and thereby prevent any spreading of the oil and the fire while forming steam at its forward edge which extinguishes the blaze.

Referring to FIGS. 7, 8, 9, and 10, the embodiment of the invention shown therein is similar to the other two embodiments previously described in that it contains a fan carried within housing 80 and a foam-forming net positioned within an adjustable frame 82. This embodiment of the invention is particularly adapted for use in a mine roadway having an upper wall or ceiling 84 and a lower wall or floor 86. The housing 80 containing the fan is provided with spoked steel wheels 88 and a handle 90 whereby the apparatus may be easily transported over the mine floor 86. As shown, the frame 82 which contains the foam-forming net is provided with a tunnel-like extension 92 having walls of rubber-imbedded fabric or other similar flexible material. The end of extension 92 opposite frame 82 is provided with a flange 94 which may be secured to a flange 96 on the exit end of housing 80 by means of bolts 98 or any other suitable fastening means. With this arrangement, the frame 82 and its extension 92, which are much lighter than the housing 80 and the fan which it carries, may be disconnected from the housing and transported separately. On each side of the frame 82 are a pair of adjustable columns 100 and 102 which may be varied in height to accommodate the distance between the ceiling 84 and floor 86.

As shown in FIG. 9, the frame 82 is similar in construction to section 58 shown in FIG. 4 and is provided with a plurality of horizontally extending rods 104 around which a woven foam-forming net 106 is stretched in a zigzag pattern. This net extends through slots 108 and 110 in the frame 82 and is held in position by means of a band 112 extending around the periphery of the frame. In this case, however, the nozzles 114 and 116 are supported on a bracket 118 which, in turn, is carried on the frame 82. Nozzles 114 and 116 communicate with a hose 120 which may be connected as at 122 to a conduit for supplying a wetting agent solution to the nozzles.

Also extending around the frame 82 are a pair of flanges 124 and 126 between which is sandwiched a flexible wall or shield 128 of canvas or other similar material. This shield may be fastened to the ceiling, floor and walls of the mine roadway by means of wooden strips 130. After the foam plug generated by the equipment shown in FIG. 7 travels down the mine roadway a certain distance, a back pressure will be created tending to force the foam plug back over the frame 82, extension 92 and housing 80. By providing the wall or shield 128, however, this condition is prevented and the foam plug must travel forwardly while any back pressure created may be easily withstood by the wall 128.

In practice, the frame 82 and extension 92 will ordinarily be disconnected from the housing 80 and stored separately. During storage, the extension 92, being flexible, will be folded up against the frame 82 to minimize the amount of space required for storage. If a mine fire should break out, the frame 82 and its folded extension 92 will be carried to a position in the mine roadway which is as close as possible to the rearward end of the actively flaming fire front. At this location the supports 100 and 102 will be adjusted to erect the frame 82 in a vertical position across the mine roadway, and the flexible wall 128 will be unfolded and secured to the mine walls, ceiling and floor by means of the wooden strips 130. After the frame 82, which carries the foam-forming net, is secured in position, the housing 80 which carries the fan will be brought forward whereby the flange 96 may be secured to the flange 94 on extension 92. The combination of assemblies 80, 82 and 92 thus form a wind tunnel arrangement similar to that shown in FIGS. 1 and 4 with the exception of the fact that one section 92 is flexible in order that the frame 82 need not be aligned with the housing 80. The conduit 120 is then connected at 122 to a supply of solution containing a foaming agent, and the fan is turned on whereby bubbles will be formed on the net 106.

The present invention thus provides a means for generating water-containing foam which may be used to fight building fires and the like as well as mine fires. The equipment is lightweight and compact and may easily be transported to the site of a fire. The size of the wind tunnel and other components shown herein will, of course, depend upon the desired foam-making capacity. In any event, the size of the wind tunnel will be smaller when a corrugated foam-forming net is employed in preference to a flat net of the type shown in FIG. 1.

Although the invention has been shown in connection with certain specific embodiments, it will be readily apparent to those skilled in the art that various changes in form and arrangement of parts may be made to suit requirements without departing from the spirit and scope of the invention.

I claim:
1. In the method of fighting fires in a mine having a forced-air ventilation system and a plurality of parallel mine roadways leading to a fire zone and through which ventilation currents flow, the steps of generating air currents in at least one of said parallel roadways and controlling the velocity and pressure of said air currents independently of the ventilation currents in the mine and utilizing said generated air currents to produce a fire-fighting foam plug which will travel down said one roadway to fire zone while permitting the ventilation currents to travel through the other parallel roadways to the fire zone where they may carry away combustible gases independently of the back pressure created in said one roadway by the foam plug.

2. In the method for fighting fires in a mine having a forced-air ventilation system and a plurality of parallel mine roadways leading to a fire zone and through which ventilation currents may flow, the steps of generating air currents in at least one of said parallel roadways, utilizing said generated air currents to produce a fire-fighting foam plug which will travel down said one roadway to the fire zone while permitting the ventilation currents to travel through the other parallel roadways to the fire zone, and controlling said ventilation currents and the currents generated in said one roadway independently of each other.

References Cited by the Examiner

UNITED STATES PATENTS 3,065,797  11/1962  Barnes _____ 169—15

OTHER REFERENCES

Fire Fighting in Underground Roadways: Experiments With Foam Plugs by H. S. Eisner and P. B. Smith—Research Report #130—U.D.C. 622.824: 614.843: 614845.3—June 1956 from the British Safety in Mines Research Establishment.

Studies With High-Expansion Foams for Controlling Experimental-Coal Mine Fires by Irving Hartman, John Nagy, R. W. Barnes and E. M. Murphy.

Bureau of Mines—Report of Investigations 5419—1958.

EVERETT W. KIRBY, *Primary Examiner.*